(12) United States Patent
Geisthardt

(10) Patent No.: US 6,904,869 B1
(45) Date of Patent: Jun. 14, 2005

(54) CONCEALED STALL DOOR LATCH

(75) Inventor: Alan C. Geisthardt, Fon du Lac, WI (US)

(73) Assignee: Plyco Corp., Elkhart Lake, WI (US)

( * ) Notice: Subject to any disclaimer, the term of this patent is extended or adjusted under 35 U.S.C. 154(b) by 11 days.

(21) Appl. No.: 10/781,367

(22) Filed: Feb. 18, 2004

(51) Int. Cl.$^7$ ................................. A01K 1/00
(52) U.S. Cl. ..................................... 119/524
(58) Field of Search .............. 119/524, 516, 119/522, 481, 741; 70/95, 96, 99

(56) References Cited

U.S. PATENT DOCUMENTS

| | | | | | |
|---|---|---|---|---|---|
| 1,581,029 | A | * | 4/1926 | Smith | 16/80 |
| 4,434,635 | A | * | 3/1984 | Borgato | 70/279.1 |
| 6,196,034 | B1 | * | 3/2001 | Diebold et al. | 70/95 |
| 6,502,435 | B2 | * | 1/2003 | Watts et al. | 70/95 |

FOREIGN PATENT DOCUMENTS

GB 2101667 A * 1/1983 ........... E05B/63/14

OTHER PUBLICATIONS

Print out of Web Page (www.mortonbuildings.com) Disclosing a Door Latch for Sliding Doors.

* cited by examiner

Primary Examiner—Michael J. Carone
Assistant Examiner—Jordan Lofdahl
(74) Attorney, Agent, or Firm—Donald J. Ersler

(57) ABSTRACT

A concealed stall door latch is installed in a sliding stall door. The sliding stall door includes a bar portion disposed on a top thereof. A handle channel is preferably disposed on one side of the bar portion. A single end channel terminates each end of the sliding stall door. The concealed sliding door latch is preferably slidably retained inside the handle channel and the end channel. The concealed sliding door latch includes a latch rod. A handle preferably extends through the handle channel from the latch rod. One end of the latch rod is biased to extend past a perimeter of the sliding stall door. A latch retainer is positioned adjacent the one end of the latch rod. The latch rod is retracted by the handle to allow the sliding door to be moved.

20 Claims, 4 Drawing Sheets

CONCEALED STALL DOOR LATCH

BACKGROUND OF THE INVENTION

1. Field of the Invention

The present invention relates generally to door latches and more specifically to a concealed stall door latch, which is mounted within a sliding stall door.

2. Discussion of the Prior Art

The prior art discloses a stall door latch that is an integral portion of a bar portion of a sliding stall door. The bar portion of the sliding stall door is located at the top of the door. The bar portion includes a plurality of vertically oriented bars. A latch bar replaces one of the vertically oriented bars in the sliding door. The latch bar is used to actuate the latching system. The latching system draws a latch pin out of a hole to allow the sliding door to be moved along a track. The drawback to this design is that it is within the contact area of an animal. If the latch bar becomes bent, thereof will work poorly or not at all.

Accordingly, there is a clearly felt need in the art for a concealed stall door latch that will not become damaged because an animal strikes a portion of the sliding stall door.

SUMMARY OF THE INVENTION

The present invention provides a concealed stall door latch, which is mounted in a sliding stall door. The concealed stall door latch is installed in a sliding stall door. The sliding stall door preferably includes a stall door, a trolley track, at least one trolley and a guide track. The trolley track is attached to a door frame. A bottom of the at least one trolley is attached to a top of the stall door and a top of the trolley rides in the trolley track. The guide track is attached to a bottom of the stall door. The guide track is sized to receive a guide bar. The stall door includes a bottom portion, a bar portion and two end channels. The bar portion is disposed on top of the bottom portion, between the two end channels. The bar portion includes a plurality of vertically bars.

The concealed sliding door latch includes a latch rod, which is slidably retained in one of the two end channels. The latch rod is preferably fabricated from rod stock. A thread is formed on one end of the rod stock. Preferably, at least two guides are retained in one of the two end channels. A hole is formed through each guide to slidably receive the rod stock. A handle is preferably formed from the rod stock by offsetting a portion thereof at substantially the other end thereof. The rod stock extends above a top of the stall door with a spring. The spring is preferably retained between a top of the stall door and a nut threaded on the one end of the rod stock. A latch retainer is preferably attached to a bottom of the trolley track, adjacent the one end of the rod stock. The latch retainer prevents the stall door from being moved. To allow the stall door to be moved, the latch rod is retracted from an extended position to a retracted position by pulling downward on the handle. The only portion of the latch rod that is visible is the handle and the other end of the latch rod.

Accordingly, it is an object of the present invention to provide a concealed stall door latch that will not become damaged because an animal strikes the bar portion thereof.

These and additional objects, advantages, features and benefits of the present invention will become apparent from the following specification.

DETAILED DESCRIPTION OF THE PREFERRED EMBODIMENTS

Figure 1:
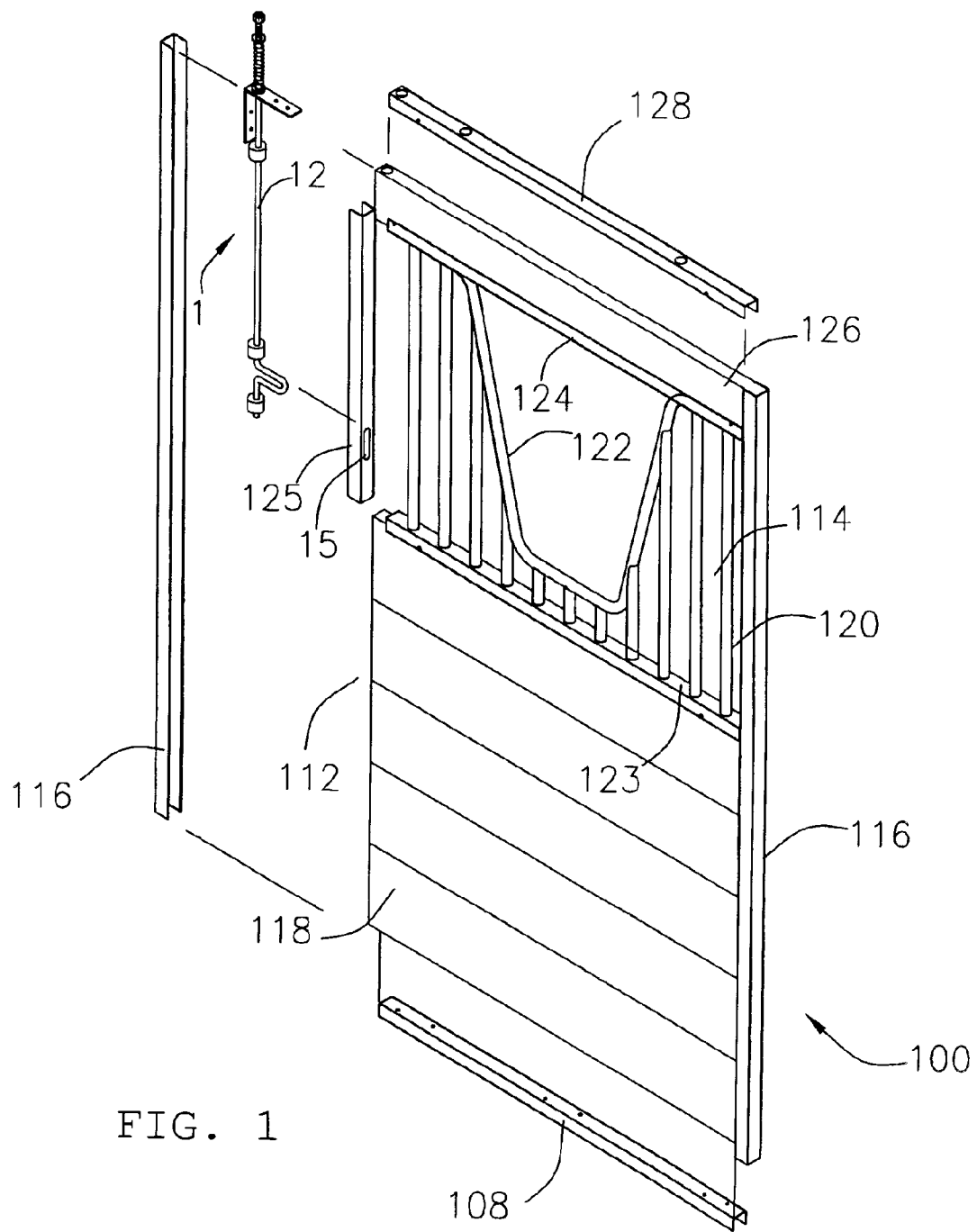
FIG. 1 is a partially exploded perspective view of a stall door with a concealed stall door latch in accordance with the present invention.
Figure 2:
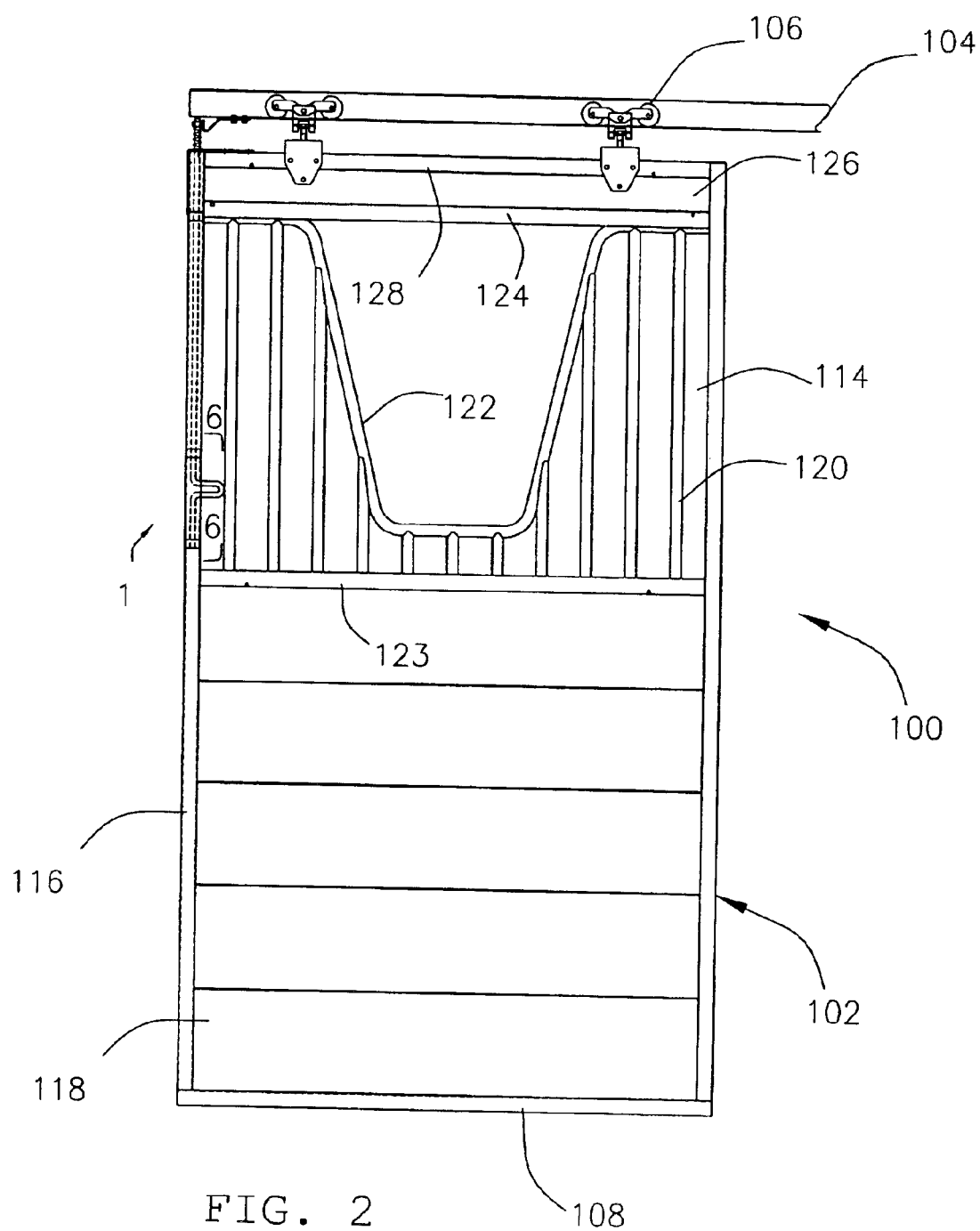
FIG. 2 is a front view of a sliding stall door with a concealed stall door latch in accordance with the present invention.
Figure 4:
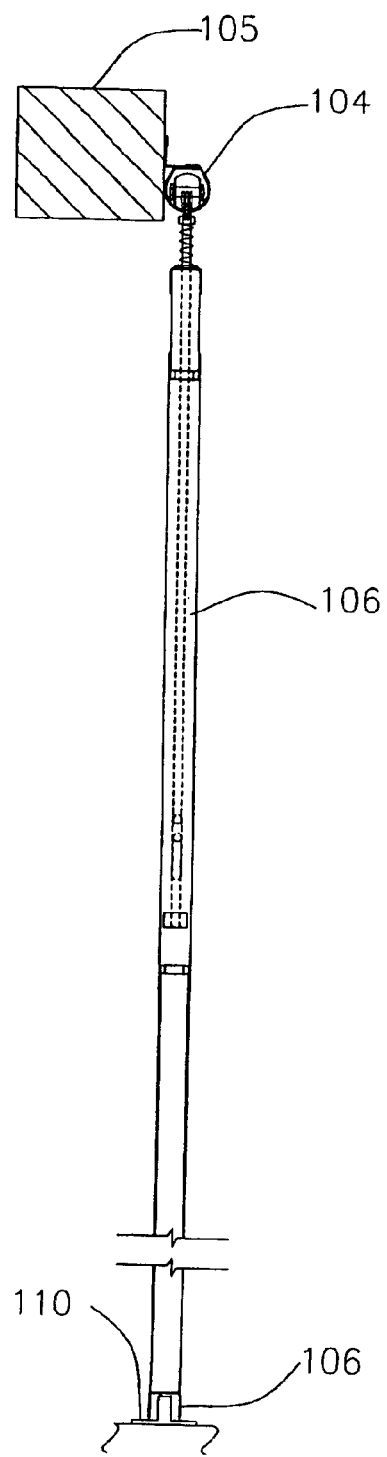
FIG. 4 is an enlarged end view of a sliding stall door with a concealed stall door latch in accordance with the present invention.

With reference now to the drawings, and particularly to FIG. 2, there is shown a front view of a sliding stall door 100 with a concealed stall door latch 1 installed therein. The sliding stall door 100 includes a stall door 102, a trolley track 104, at least one trolley 106 and a guide track 108. With reference to FIG. 4, the trolley track 104 is attached to a door frame 105. A bottom of the at least one trolley 106 is attached to a top of the stall door 102 and a top of the trolley 106 rides in the trolley track 104. The top of the stall door 102 is also a portion of the perimeter. The guide track 108 is attached to a bottom of the sliding stall door 102. The guide track 108 is sized to receive a guide bar 110. The guide bar 110 is attached to a floor or the like.

The stall door 102 includes a bottom portion 112, a bar portion 114 and two end channels 116. The bar portion 114 is disposed on top of the bottom portion 112, between the two end channels 116. The two end channels 116 are sized to receive both ends of the bottom portion 112. The two end channels 116 are attached to the bottom portion 112 with fasteners or any other suitable attachment method. The bottom portion 112 preferably includes a plurality of wood boards 118.

The bar portion 114 preferably includes a plurality of vertical bars 120, a window bar 122, a bottom support 123 a top support 124 and a handle channel 125. The plurality of vertical bars 120 are retained between the bottom support 123, the top support 124 and the window bar 122. The bar portion 114 is preferably retained between the bottom portion 112 and a top frame member 126. The top frame member 126 is received by the two end channels 116 and retained with fasteners or any other suitable method. A top cap 128 is preferably attached to a top of the top frame member 126. The handle channel 125 is attached to the ends of the bottom support 123 and the top support 124. The handle channel 125 is sized to be received by an inside width of one of the two end channels 116. One of the two end channels 116 or the handle channel 125 inserted into one of the two end channels 116 creates an upright member.

Figure 3:
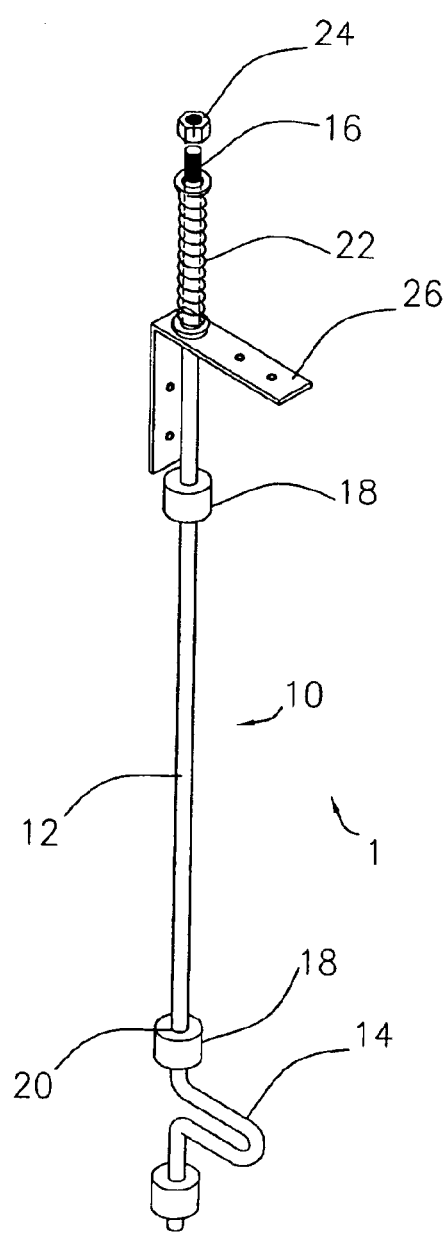
FIG. 3 is an enlarged perspective view of a concealed stall door latch in accordance with the present invention.

With reference to FIG. 3, the concealed sliding door latch 1 includes a latch rod 10, which is slidably retained in one of the two end channels 116 or one of the two end channels and the handle channel 125. The latch rod 10 is preferably fabricated from a rod stock 12, but other materials may also be used. A thread 16 is formed on one end of the rod stock 12. A handle 14 is preferably formed in the rod stock 12 by offsetting a portion thereof at substantially the other end thereof.

Figure 5:
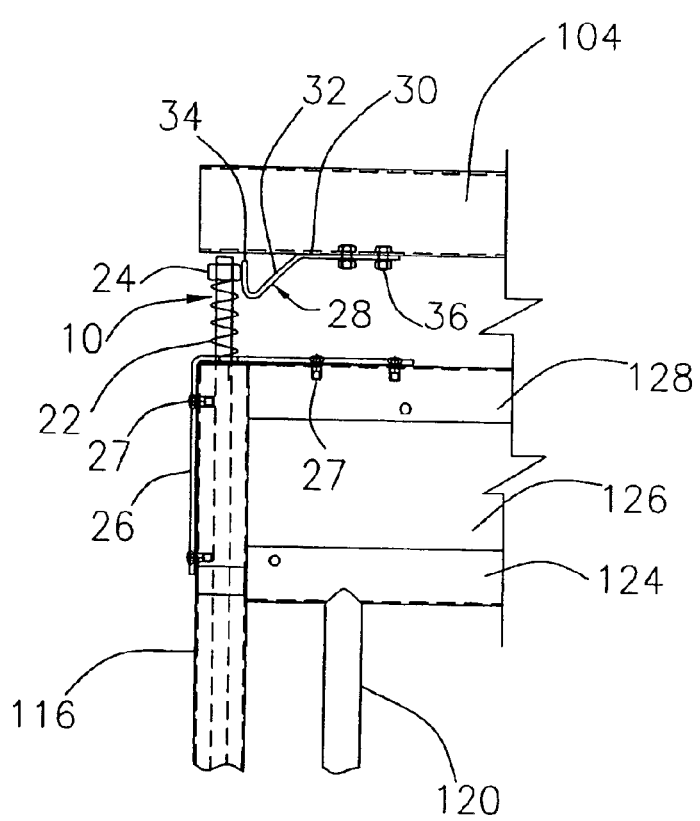
FIG. 5 is an enlarged side view of a latch retainer, adjacent one end of a concealed stall door latch in accordance with the present invention.
Figure 6:
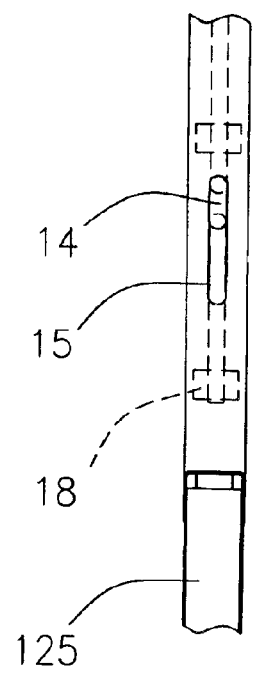
FIG. 6 is an enlarged front view of a handle of a concealed stall door latch in accordance with the present invention.

With reference to FIG. 6, a handle slot 15 is formed in the handle channel 125. Preferably, at least two guides 18 are attached to the inside perimeter of one of the two end channels and/or the handle channel 125 with fasteners or any other suitable method. The handle channel 125 is not required to slidably retain the latch rod 10. A hole 20 is formed through each guide 18 to slidably receive the rod stock 12. With reference to FIG. 5, the one end of the rod stock 12 extends above the top cap 128 with a spring 22. The spring 22 is preferably retained between the top cap 128 and a nut 24 threaded on to the one end of the rod stock 12. An angle strap 26 is preferably used to reinforce the sliding action of the latch rod 10 at the one thereof. The angle strap 26 is attached to the top frame member 126 with at least two fasteners 27 or any other suitable method.

A latch retainer 28 is attached to a bottom of the trolley track 104, adjacent the one end of the latch rod 10. The latch retainer 28 includes a base portion 30 an inclined portion 32 and a stop portion 34. The inclined portion 32 extends from the base portion 30 and the stop portion 34 extends from the inclined portion 32. The latch retainer 28 is attached to the bottom of the trolley track 104 with at least one fastener 36. The stop portion 34 of the latch retainer 28 prevents the stall door 102 from moving, when the one end of the latch rod 10 is extended. However, other types or designs of latch retainers may also be used. To allow the stall door 102 to move, the latch rod 10 is retracted from an extended position to a retracted position by pulling down on the handle 14. The stall door 102 is then slid and the handle 14 may be released after the one end of the latch rod 10 is past the stop portion 34. The stall door 102 may be returned to a locked position without having to pull the handle 14, downward. The one end of the latch rod 10 will ride the inclined portion 32 over the stop portion 34.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of concealing a door latch in a sliding stall door, comprising the steps of:
   providing a stall door having an upright member;
   attaching at least one trolley to a top of the stall door, retaining said at least one trolley in a trolley track;
   retaining slidably a latch rod in the upright member;
   biasing one end of said latch rod such that thereof extends from a perimeter of the stall door;
   positioning a latch retainer adjacent the one end of said latch rod, said latch retainer preventing the stall door from moving; and
   retracting said latch rod to allow the stall door to be moved.

2. The method of concealing a door latch in a sliding stall door of claim 1, further comprising the step of:
   extending a handle from said latch rod, pulling said handle to retract said latch rod.

3. The method of concealing a door latch in a sliding stall door of claim 1, further comprising the step of:
   retaining at least two guides in the upright member, said latch rod being slidably retained in said at least two guides.

4. The method of concealing a door latch in a sliding stall door of claim 1, further comprising the step of:
   biasing said latch rod by retaining a spring on the one end thereof.

5. The method of concealing a door latch in a sliding stall door of claim 1, further comprising the step of:
   providing said latch retainer with a base portion, an inclined portion and a stop portion, extending said inclined portion from said base portion and extending said stop portion from said inclined portion.

6. A method of concealing a door latch in a sliding stall door, comprising the steps of:
   providing a stall door having an upright member;
   retaining at least two guides in the upright member, slidably retaining a latch rod in said at least two guides;
   extending a handle from said latch rod, pulling said handle to retract said latch rod;
   biasing one end of said latch rod such that thereof extends from a perimeter of the stall door;
   positioning a latch retainer adjacent the one end of said latch rod, said latch retainer preventing the stall door from moving; and
   retracting said handle to allow the stall door to be moved.

7. The method of concealing a door latch in a sliding stall door of claim 6, further comprising the step of:
   biasing said latch rod by retaining a spring on the one end thereof.

8. The method of concealing a door latch in a sliding stall door of claim 6, further comprising the step of:
   providing said latch retainer with a base portion, an inclined portion and a stop portion, extending said inclined portion from said base portion and extending said stop portion from said inclined portion.

9. The method of concealing a door latch in a sliding stall door of claim 6, further comprising the step of:
   attaching at least one trolley to a top of the stall door, retaining said at least one trolley in a trolley track.

10. A method of concealing a door latch in a sliding stall door, comprising the steps of:
    providing a stall door having an upright member;
    retaining slidably a latch rod in the upright member;
    biasing one end of said latch rod with a spring, such that the one end of said latch rod extends from a perimeter of the stall door;
    positioning a latch retainer adjacent the one end of said latch rod, said latch retainer preventing the stall door from moving; and
    retracting said latch rod to allow the stall door to be moved.

11. The method of concealing a door latch in a sliding stall door of claim 10, further comprising the step of:
    extending a handle from said latch rod, pulling said handle to retract said latch rod.

12. The method of concealing a door latch in a sliding stall door of claim 10, further comprising the step of:
    retaining at least two guides in the upright member, said latch rod being slidably retained in said at least two guides.

13. The method of concealing a door latch in a sliding stall door of claim 10, further comprising the step of:
    providing said latch retainer with a base portion, an inclined portion and a stop portion, extending said inclined portion from said base portion and extending said stop portion from said inclined portion.

14. The method of concealing a door latch in a sliding stall door of claim 10, further comprising the step of:
    attaching at least one trolley to a top of the stall door, retaining said at least one trolley in a trolley track.

15. A method of concealing a door latch in a sliding stall door, comprising the steps of:

provoking a stall door having an upright member;

retaining slidably a latch rod in the upright member;

biasing one end of said latch rod such that thereof extends from a perimeter of the stall door, said latch rod having a substantially vertical orientation;

positioning a latch retainer adjacent the one end of said latch rod, said latch retainer preventing the stall door from moving; and retracting said latch rod to allow the stall door to be moved.

16. The method of concealing a door latch in a sliding stall door of claim 15, further comprising the step of:

extending a handle from said latch rod, pulling said handle to retract said latch rod.

17. The method of concealing a door latch in a sliding stall door of claim 15, further comprising the step of:

retaining at least two guides in the upright member, said latch rod being slidably retained in said at least two guides.

18. The method of concealing a door latch in a sliding stall door of claim 15, further comprising the step of:

biasing said latch rod by retaining a spring on the one end thereof.

19. The method of concealing a door latch in a sliding stall door of claim 15, further comprising the step of:

providing said latch retainer with a base portion, an inclined portion and a stop portion, extending said inclined portion from said base portion and extending said stop portion from said inclined portion.

20. The method of concealing a door latch in a sliding stall door of claim 15, further comprising the step of:

attaching at least one trolley to a top of the stall door, retaining said at least one trolley in a trolley track.

* * * * *